US009600775B2

(12) United States Patent
Coles et al.

(10) Patent No.: US 9,600,775 B2
(45) Date of Patent: Mar. 21, 2017

(54) LARGE SURVEY COMPRESSIVE DESIGNS

(71) Applicant: SCHLUMBERGER TECHNOLOGY CORPORATION, Sugar Land, TX (US)

(72) Inventors: Darrell Coles, Katy, TX (US); Michael David Prange, Somerville, MA (US); Hugues A. Djikpesse, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 103 days.

(21) Appl. No.: 14/162,700

(22) Filed: Jan. 23, 2014

(65) Prior Publication Data

US 2015/0206060 A1    Jul. 23, 2015

(51) Int. Cl.
*G06N 7/00*    (2006.01)
(52) U.S. Cl.
CPC .................. *G06N 7/005* (2013.01)
(58) Field of Classification Search
None
See application file for complete search history.

(56) References Cited

U.S. PATENT DOCUMENTS

| | | | |
|---|---|---|---|
| 6,594,394 B1 | 7/2003 | Stromberg et al. | |
| 2002/0169735 A1 | 11/2002 | Kil et al. | |
| 2005/0157589 A1 | 7/2005 | Laake | |
| 2007/0118346 A1* | 5/2007 | Wen | E21B 43/00 703/10 |
| 2009/0216996 A1* | 8/2009 | Goodman | G06F 17/16 712/28 |
| 2011/0022319 A1* | 1/2011 | Djikpesse | G01V 99/00 702/11 |
| 2012/0165691 A1 | 6/2012 | Ting et al. | |
| 2013/0185033 A1* | 7/2013 | Tompkins | G01V 11/00 703/2 |

FOREIGN PATENT DOCUMENTS

KR    10-2012-0125284 A    11/2012

OTHER PUBLICATIONS

Wall, Michael E., Andreas Rechtsteiner, and Luis M. Rocha. "Singular value decomposition and principal component analysis." A practical approach to microarray data analysis. Springer US, 2003. 91-109.*

(Continued)

*Primary Examiner* — Stanley K Hill
*Assistant Examiner* — David H Kim

(57) ABSTRACT

Apparatus and methods of categorizing a subterranean formation including collecting data related to the formation, performing an algorithm comprising guided Bayesian survey design, identifying data observations to collect, and collecting additional data observations related to the formation. In some embodiments, the performing comprises forming a matrix or loading a matrix or both. Apparatus and methods of categorizing a subterranean formation including collecting data related to the formation, performing an algorithm comprising guided Bayesian survey design, identifying data observations to use, and processing the data observations wherein the observations require less processing time than if no algorithm were performed.

21 Claims, 6 Drawing Sheets

(56) References Cited

OTHER PUBLICATIONS

Gebremedhin, Assefaw H., Alex Pothen, and Andrea Walther. "Exploiting sparsity in jacobian computation via coloring and automatic differentiation: a case study in a simulated moving bed process." Advances in Automatic Differentiation. Springer Berlin Heidelberg, 2008. 327-338.*
Ajo-Franklin, Jonathan, "Optimal experiment design for time-lapse traveltime tomography", Geophysics, vol. 74, No. 4, 2009, pp. Q27-Q40.
Barth et al., "Oceanographic experiment design by simulated annealing", Journal of Physical Oceanography, vol. 20, No. 1, Sep. 1990, pp. 1249-1263.
Coles, et al., "A free lunch in linearized experimental design?", Journal in Computers & Geosciences, vol. 37, Issue 8, Nov. 2011, pp. 1026-1034.
Coles, et al., "A method of fast, sequential experimental design for linearized geophysical inverse problems", Geophysical Journal International, vol. 178, Issue 1, Jul. 2009, pp. 145-158.
Coles, et al., "Efficient nonlinear Bayesian survey design using DN optimization", Geophysics, Technical Papers, vol. 76, Issue 2, Mar. 2011, pp. Q1-Q8.
Coles, et al., "Optimal nonlinear design of marine borehole seismic surveys", Geophysics, vol. 78, No. 3, 2013, pp. WB17-WB29.
Coles, et al., "Toward efficient computation of the expected relative entropy for nonlinear experimental design", Inverse Problems, vol. 28, No. 5, Apr. 23, 2012, 21 pages.
Curtis, et al., "Reconditioning inverse problems using the genetic algorithm and revised parameterization", Geophysics, vol. 62, No. 5, 1997, pp. 1524-1532.
Curtis, A. et al., "A Deterministic Algorithm for Experimental Design Applied to Tomographic and Microseismic Monitoring Surveys", Geophysical Journal International, vol. 157, No. 2, May 2004, pp. 595-606.
Djikpesse, et al., "Bayesian survey design to optimize resolution in waveform inversion", Geophysics, vol. 77, No. 2, 2012, pp. R81-R93.
Furman, et al., "Optimization of ERT Surveys for Monitoring Transient Hydrological Events Using Perturbation Sensitivity and Genetic Algorithms", Vadose Zone Journal, vol. 3, No. 4, 2004, pp. 1230-1239.
Gu, et al., "Efficient Algorithms for Computing a Strong Rank-Revealing QR Factorization", SIAM Journal on Scientific Computing, vol. 17, No. 4, 1996, pp. 848-869.
Guest, et al., "Iteratively constructive sequential design of experiments and surveys with nonlinear parameter-data relationships", Journal of Geophysical Research: Solid Earth, vol. 114, Issue B4, Apr. 2009, 14 pages.
Guest, et al., "On standard and optimal designs of industrial-scale 2-D seismic surveys", Geophysical Journal International, vol. 186, Issue 2, Aug. 2011, pp. 825-836.
Habashy, et al., "Source-receiver compression scheme for full-waveform seismic inversion", Geophysics, vol. 76, No. 4, 2011, pp. R95-R108.
Haber, et al., "Numerical methods for experimental design of large-scale linear ill-posed inverse problems", Inverse Problems, vol. 24, No. 5, 2008.
Haber, et al., "Numerical methods for the design of large-scale nonlinear discrete ill-posed inverse problems", Inverse Problems, vol. 26, No. 2, 2010.

Herrmann, Felix, "Randomized sampling and sparsity: Getting more information from fewer samples", Geophysics, vol. 75, Issue 6, Nov. 2010, pp. WB173-WB187.
Khodja, et al., "Guided Bayesian optimal experimental design", Inverse Problems, vol. 26, No. 1, 2010, pp. 1-20.
Krebs, et al., "Fast full-wavefield seismic inversion using encoded sources", Geophysics, vol. 74, No. 6, 2009, pp. WCC177-WCC188.
Loke, et al., "Parallel computation of optimized arrays for 2-D electrical imaging surveys", Geophysical Journal International, vol. 183, Issue 3, Dec. 2010, pp. 1302-1315.
Maurer, et al., "Recent advances in optimized geophysical survey design", Geophysics, vol. 75, No. 5, 2010, pp. 75A177-75A194.
Mitchell, Toby, "An Algorithm for the Construction of "D-Optimal" Experimental Designs", Technometrics, vol. 16, No. 2, May 1974, pp. 203-210.
Rabinowitz, et al., "Optimal Configuration of a Seismographic Network: A Statistical Approach", Bulletin of the Seismological Society of American, vol. 81, No. 1, 1990, pp. 187-196.
Rawlinson, et al., "Derivation and implementation of a nonlinear experimental design criterion and its application to seismic network expansion at Kawerau geothermal field, New Zealand", Geophysical Journal International, vol. 191, Issue 2, Nov. 2012, pp. 686-694.
Rezaie, et al., "Reducing the Dimensionality of Geophysical Data in Conjunction with Seismic History Matching", SPE 153924, 74th EAGE Conference & Exhibition, From 3D/4D Seismic to Reservoir Flow, Jun. 4, 2012.
Stummer et al., "Experimental design: Electrical resistivity data sets that provide optimum subsurface information", Geophysics, vol. 69, No. 1, 2004, pp. 120-139.
Stummer, et al., "Optimization of DC resistivity data acquisition: real-time experimental design and a new multielectrode system", IEEE Transactions on Geoscience and Remote Sensing, vol. 40, No. 12, 2002, pp. 2727-2735.
Tarantola, Albert, "Inverse Problem Theory", Society for Industrial and Applied Mathematics, vol. 130, Philadelphia, PA, 2005, p. 69.
Schulmberger, "Dual Coil Shooting Multivessel Full-Azimuth Acquisition", Retrieved from the Internet: <http://www.slb.com/services/seismic/seismic_acquisition/services/marine/techniques/dualcoilshooting.aspx>, Jul. 18, 2014, 1 page.
Wilkinson, et al., "Optimization of Array Configurations and Panel Combinations for the Detection and Imaging of Abandoned Mineshafts using 3D Cross-Hole Electrical Resistivity Tomography", Journal of Environmental & Engineering Geophysics, vol. 11, No. 3, 2006, pp. 213-221.
Atkinson, et al., "Optimum Experimental Designs, with SAS", Oxford University Press, vol. 34, New York, 2007, pp. 53 and 135-136.
Golub, et al., "Matrix Computations", 3rd Ed., The Johns Hopkins University Press, Baltimore, MD, 1996, pp. 70, 72, 109, 310 and 448.
Fedorov, et al., "Model-Oriented Design of Experiments", vol. 125, Springer, New Yorik, 1997, pp. 1-2.
Pukelsheim, Friedrich, "Optimal Design of Experiments", Society for Industrial and Applied Mathematics, vol. 50, Philadelphia, PA, 2006, pp. 25 and 136.
International Search Report and Written Opinion issued in related PCT application PCT/US2015/012710 on Apr. 30, 2015, 10 pages.
International Preliminary Report on Patentability issued in related PCT Application PCT/US2015/012710 on Jul. 26, 2016, (8 pages).

* cited by examiner

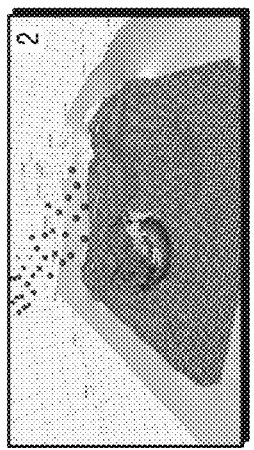
FIG. 7A
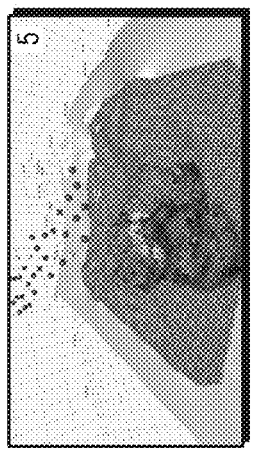
FIG. 7B
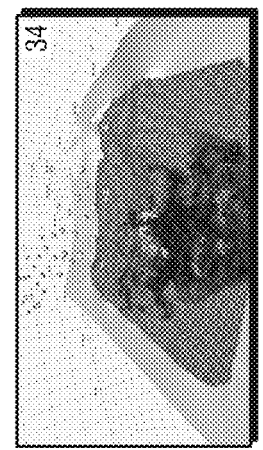
FIG. 7C
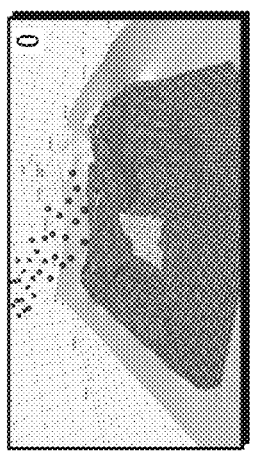
FIG. 7D
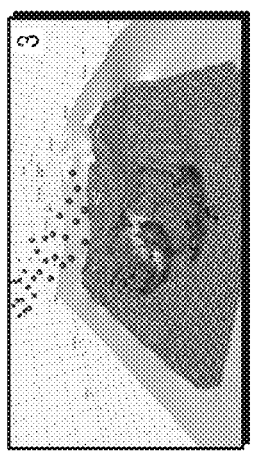
FIG. 7E
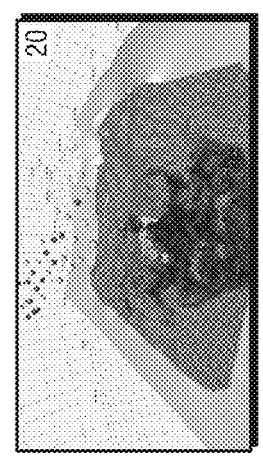
FIG. 7F
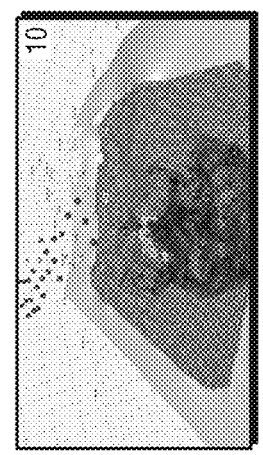
FIG. 7G
FIG. 7H
FIG. 7I
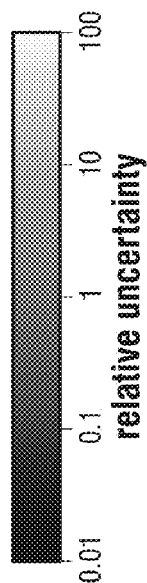

LARGE SURVEY COMPRESSIVE DESIGNS

BACKGROUND

We are in an era of 'Big Data' in industrial geoscience. In commercial settings, massive data volumes are routinely acquired that challenge our ability to store and intelligently process them. The volume of data routinely acquired in industrial settings is becoming so large that it can no longer be processed in toto with traditional processing tools. In exploration seismology, for instance, it is not unusual to collect hundreds of millions of seismic traces of several thousand time samples each, which results in data volumes on the order of a trillion values. Our ability to store and mine this deluge of information is a major technical challenge. Model-oriented design is useful to the geosciences. Maurer and Curtis give a comprehensive review of the state of the art, covering topics ranging from the optimization of earthquake-monitoring networks and electromagnetic surveys, to the optimum design of seismic tomography experiments and seismic amplitude variation with offset/angle surveys. Maurer and Curtis also discuss the algorithms typically used for the optimization aspect of design, including global and sequential strategies

FIGURES

FIGS. 7A-7I are a series of schematic views of D-optimum selection order and forecasted model uncertainty.

SUMMARY

Figure 1:
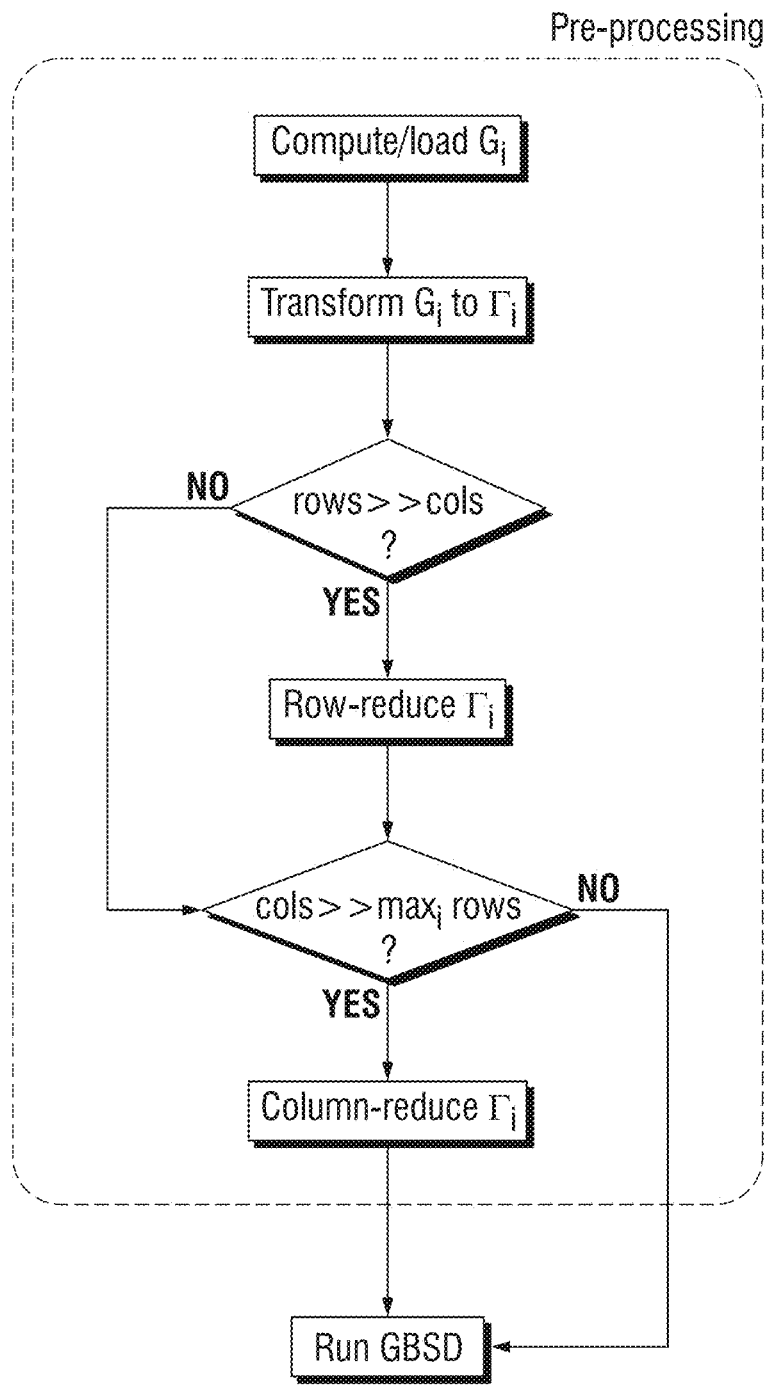
FIG. 1 is a flowchart of a reduction workflow for Guided Bayesian survey design. Filled boxes signify distributable work.

Embodiments herein relate to apparatus and methods of categorizing a subterranean formation including collecting data related to the formation, performing an algorithm comprising guided Bayesian survey design, identifying data observations to collect, and collecting additional data observations related to the formation. In some embodiments, the performing comprises forming a matrix or loading a matrix or both. Embodiments herein relate to apparatus and methods of categorizing a subterranean formation including collecting data related to the formation, performing an algorithm comprising guided Bayesian survey design, identifying data observations to use, and processing the data observations wherein the observations require less processing time than if no algorithm were performed.

DETAILED DESCRIPTION

Several techniques have recently arisen to address big data in geoscience, including compressive sensing, dimension reduction, source encoding, and optimal experimental design. The common goal of these methods is, by some means, to select and process a smaller data volume while achieving the same or comparable results as though the entire data volume had been used.

Herein we focus on experimental design, the theory and practice of designing experiments to maximize the expected information in data observations. Among the methods noted above, optimal design is distinguished because it can be applied a priori, before data acquisition, to prescribe the observation locations where data are forecast to be most informative for the processing workflow, and also a posteriori, to select the most informative data from an extant dataset. The other methods work only a posteriori and do not optimize the forecasted information in data. In other words, optimal experimental design is unique because (1) it is an optimization method and (2) it can tell us where to make data observations beforehand, resulting in smaller data volumes, faster processing times, and reduced acquisition costs.

In particular, we focus on model-oriented design and analysis (MODA), which is optimal experimental design for the case when the data are related to some model parameters of interest through a specified mathematical model, hereinafter called a theoretical function. For example, the equation of a parabola is a theoretical function that describes the trajectory of a ball thrown under the effect of gravity. Supposing the position of the ball is observed with a time-lapse camera, the times at which the observations are made constitute an experiment, and determining the optimal observation points at which the ball should be photographed to infer the gravitational acceleration with maximum precision is an example of a MODA problem.

While MODA can be used to optimally select maximally informative data subsets for subsequent analysis, it is itself impeded by large data volumes, large earth models, and the exigencies of computation in high-dimensions. Several approaches have been proposed to reduce the computational burden of optimal design, including experiment hyper-parameterization, in which spatially distributed experiments are modeled and optimized with respect to a few control parameters, fast optimization algorithms, and nonlinear design theory that avails itself of the above algorithms.

Herein we find that a dimension reduction pre-processing step can greatly reduce the subsequent memory and computing requirements of linearized MODA. We focus on a MODA technique called Guided Bayesian survey design and demonstrate dimension reduction on a synthetic data example followed by a real, industrial-scale optimal design problem in marine seismic data acquisition in which a compression rate greater than 99.8 percent was achieved.

Guided Bayesian survey design (GBSD) is a linearized, Bayesian method of model-oriented experimental design that optimizes an experiment—in this context, a geoscientific survey—while taking into account prior information on the model parameters of interest.

Specifically, suppose $$d(m|\xi) = g(m|\xi) + \epsilon(m|\xi) \qquad (1)$$

is a mathematical model relating data vector d to model parameter vector m, given a set of observation points (experiment) $\xi$, where g is the theoretical function and $\epsilon$ is a vector of stochastic measurement errors. A linearization of equation 1 about reference model $m_0$ is given by $$d = Gm + \epsilon, \qquad (2)$$

where G is the Jacobian matrix of partial derivatives of g with respect to the model parameters m.

Suppose one has a priori knowledge of m which is characterized by a prior model distribution, and suppose this distribution is multivariate Gaussian (multinormal) with mean $m_0$ and covariance $\Sigma_m$, i.e., $m \sim N(m_0, \Sigma_m)$. This prior distribution represents the current uncertainty on the model parameters; the broader it is, the more uncertain is it that $m_0$ is the correct model parameterization. Moreover, suppose one knows a priori that the measurement noise will be multinormally distributed with zero mean and covariance $\Sigma_d$, i.e., $\epsilon \sim \mathcal{N}(0, \Sigma_d)$. One reference proves that the posterior model distribution—the distribution of the model parameters after the observed data vector, $d_{obs}$, corresponding to experiment is assimilated with prior information—is also multinormal with mean $$\tilde{m} = m_0 + \tilde{\Sigma}_m G^* \Sigma_d^{-1}(d_{obs} - Gm_0) \quad (3)$$

and covariance $$\tilde{\Sigma}_m \equiv (\Sigma_m^{-1} + G^* \Sigma_d^{-1} G)^{-1} \quad (4)$$

where '*' denotes the Hermitian transpose. Note that the existence of the inverse posterior covariance matrix is guaranteed if the prior covariance matrix is invertible, which can always be made true in practice.

In GBSD, equations 3 and 4 are respectively forecasts of the model vector and its uncertainty if the data from experiment $\xi$ were acquired and assimilated with prior information. Guided Bayesian design seeks to minimize the forecasted model uncertainty with respect to $\xi$ by minimizing $$\log \det \tilde{\Sigma}_m, \quad (5)$$

which is the D-optimality criterion in optimal experimental design. The D-criterion is proportional to the volume of the confidence region in the multinormal case, so GBSD can be understood to minimize posterior model uncertainty by minimizing the forecasted confidence region.

For ease of notation, it is useful to introduce the precision matrix, which is defined as the inverse of a covariance matrix. Equation 4 can then be reformulated in the tidier form, $$\tilde{P}_m \equiv P_m + G^* P_d G, \quad (6)$$

where $\tilde{P}_m \equiv \tilde{\Sigma}_m^{-1}$, $P_m \equiv \Sigma_m^{-1}$ and $\tilde{P}_d \equiv \tilde{\Sigma}_d^{-1}$. D-optimality is equivalently honored by maximizing $$\log \det \tilde{P}_m, \quad (7)$$

Hence, minimizing posterior model uncertainty is equivalent to maximizing posterior model precision under the D-criterion. Because $\Sigma_m$ is a prior and thus is constant and positive definite, it is easy to show that maximizing $$\Phi(\xi) = \log \det \sum_m^{\frac{1}{2}} \tilde{P}_m \sum_m^{\frac{1}{2}}, \quad (8)$$

equivalently honors the D-criterion, where the superscript signifies the principal square root of the matrix. This formulation of the D-optimality objective function will be used to simplify later development.

Compression

Dimension reduction describes any method by which multidimensional datasets are reduced to a lower-dimensional space where all or most of the data variability is preserved. In other words, dimension reduction is a form of data compression, and hereafter these terms are used interchangeably. We posit that large data analysis problems frequently give rise to significant redundancies in data and model space. For example, in a seismic survey design problem in which the model is a vector of scattering strengths along a seismic reflecting surface, there is clearly some point at which increasing the scatterer density will not improve the image resolution when the maximum frequency of the survey is fixed. The scattering strengths just become increasingly correlated as the resolution of the surface description increases. Similarly in the data space, nearby measurements are almost always correlated. Dimension reduction takes advantage of such correlations by finding a lower-dimensional set of intrinsic variables in which the physical problem can be described and solved.

When the data are arrayed as a matrix, various techniques from statistics and linear algebra are available for dimension reduction. These methods often involve some kind of matrix factorization, such as singular value decomposition or QR-factorization. This report focuses on the reduction of large matrices by distributable matrix factorization. That is, the factorization can be distributed over multiple machines in order to reduce factorization runtime and, subsequently, the memory footprint and computational burden of any subsequent computation on the data matrix.

Because the D-criterion is determinant-based, and the determinant equals the cumulative product of the eigenspectrum (the eigenvalues) of a matrix, it is sufficient for the chosen compression scheme to be (approximately) spectrum-preserving.

To reduce the row-dimension of matrix X and to distribute the work over multiple processes, one method amenable to this is the rank-revealing QR factorization (RRQR) (other rank-revealing factorizations should also work with the following theory). In classical QR-factorization, a matrix is factored into the product of an orthonormal matrix, Q, and an upper triangular matrix, R:

$$X = QR.$$

Rank-revealing QR modifies the factorization by introducing a column permutation matrix, $\Pi$, such that $$X\Pi = QR.$$

The permutation $\Pi$ is chosen so that the (absolute) diagonal entries of R decrease. If X has rank k, only the first k diagonal entries of R are nonzero, thus revealing the rank of X. Moreover, when X is row-rank deficient, only the first k rows of R have nonzero entries. In other words, if rank(X)= k<m, R is upper 'trapezoidal', with nonzero rows up to the k-th row.

Consider an arbitrary partitioning of X into the row-block form, a.

$$X = \begin{bmatrix} X_1 \\ X_2 \end{bmatrix}, \quad (9)$$

and let $X_i \Pi_i \equiv Q_i R_i$ be the RRQR of the i-th partition of X, whence a.

$$X = \begin{bmatrix} Q_1 R_1 \Pi_1^* \\ Q_2 R_2 \Pi_2^* \end{bmatrix}, \quad (10)$$

noting that the inverse of a permutation matrix is its (Hermitian) transpose. Omitting the $Q_i$s and performing RRQR on the remainder gives a.
$$\begin{bmatrix} R_1 \Pi_1^* \\ R_2 \Pi_2^* \end{bmatrix} \Pi \equiv QR. \quad (11)$$

Recalling that all Q matrices are orthonormal, notice that i. $X^*X = \Pi_1 R_1^* R_1 \Pi_1^* + \Pi_2 R_2^* R_2 \Pi_2^*$ and a. $R^*R = \Pi X^* X \Pi^*$.

Now, all permutation matrices are orthonormal, and orthonormal matrices have the property that, when multiplied by an arbitrary matrix A, the product has the same eigenspectrum as A. Therefore, $R^*R$ has the same eigenspectrum as $X^*X$. Furthermore, since the eigenspectrum of $A^*A$ equals the square of the eigenspectrum of A, R and X must therefore have the same eigenspectrum up to signs.

More generally, the matrix X can be partitioned into an arbitrary number of row-blocks, a.
$$X = \begin{bmatrix} X_1 \\ \vdots \\ X_r \end{bmatrix}, \quad (12)$$

and the same results obtain. To see this, note that if $R_i \Pi_i^*$ corresponds to the i-th partition of X and a.
$$\begin{bmatrix} R_1 \Pi_1^* \\ \vdots \\ R_r \Pi_r^* \end{bmatrix} \Pi \equiv QR, \quad (13)$$

then

1.
$$X^*X = \sum_{i=1}^{r} \Pi_i R_i^* R_i \Pi_i^*$$

and a. $R^*R = \Pi X^* X \Pi^*$, as before, whence the same eigenspectrum arguments apply.

The derivations above show that a matrix X can be arbitrarily partitioned and transformed via a series of RRQR factorizations into a right-triangular matrix R, which shares its eigenspectrum with X. Because the partitions of X can be factored independently, X can be factored—at least partly—in parallel. Each process can be assigned an $X_i$, for which it computes the corresponding $Q_i R_i \Pi_i^*$. The resulting $R_i \Pi_i$s can then be sent to one process, on which a second RRQR factorization is computed, resulting in the final transformation of X into R.

The importance of using rank revealing factorizations is this: if X is m-by-n, R is initially n-by-n, but if k≡rank(X) ≤min(m, n) then R may be truncated to dimensions k-by-n with no loss of information. Dimension reduction may thus be effected when the numerical rank of X is less than its row-dimension. This is a common situation with large geoscientific experiments, in which there are many more data observations (rows) than model parameters (columns).

It is worth noting that R and the $R_i \Pi_i$s are sparse, which contributes to further storage efficiencies.

It is also notable that QR in equations 11 and 13 is not strictly the RRQR factorization of X. It would be had the $Q_i$s been retained, but they have been omitted to boost computational efficiency, since only a spectrum-preserving reduction is required and eigenspectra are unaltered under orthonormal transformation.

Furthermore, a permutation matrix should never be explicitly stored, as it can be efficiently represented as a vector of integers. Also, multiplication with permutation matrices should never be explicitly done, since permutation simply reorganizes columns (rows).

The theory above outlines how to reduce the row-dimension of a matrix. It is easily extended to column-dimension reduction by replacing X by its transpose or Hermitian.

Composite Observations

A traditional MODA problem for an active remote-sensing technology is to optimize the positions of individual sensors with respect to a controlled source. Geoscientific data acquisition practices tend to expand this problem by replacing individual sensors with arrays of sensors in predefined geometries. Sensor arrays abound in geoscience: 3D resistivity systems comprising grids of geoelectrodes simultaneously record the potential field response from a single EM source; marine seismic streamers comprising multiple cables with hydrophones placed along their lengths simultaneously record the pressure field response from a single airgun. Hereafter, we refer to any set of data observations that are taken as a unit a composite observation.

A Guided Bayesian design problem with composite observations is essentially the same as one with individual observations, only the optimization is with respect to sensor arrays rather than single sensors. The mathematical machinery of GBSD needs only minor alteration. The linearized theoretical function from equation 2 becomes 1.
$$\begin{bmatrix} d_1 \\ \vdots \\ d_n \end{bmatrix} = \begin{bmatrix} G_1 \\ \vdots \\ G_n \end{bmatrix} m, \quad (14)$$

where $d_i$ is the data vector corresponding to the i-th composite observation and $G_i$ is its corresponding Jacobian. Furthermore, the posterior precision matrix in equation 6 becomes 1.
$$\tilde{P}_m = P_m + \sum_{i=1}^{r} G_i^* P_{d_i} G_i, \quad (15)$$

where $P_{d_i}$ is the measurement error precision matrix for the i-th composite observation.

GBSD with Compression

When the dimensions of the data and model vectors are large, the resulting Jacobian in Guided Bayesian survey design can be computationally unwieldy, and compression methods are needed. Here, we assume the experiment will consist of composite observations, and we accordingly reformulate the GBSD objective function to take best advantage of the reduction theory just developed.

By substituting equation 15 into expression 8 and simplifying, the GBSD objective function can be rewritten as $$\Phi(\xi) = \log\det\left(1 + \sum_{i=i}^{r} \Gamma_i^* \Gamma_i\right), \quad (16)$$

where I is the identity matrix and $$\Gamma_i \equiv P_{d_i}^{\frac{1}{2}} G_i \Sigma_m^{\frac{1}{2}}.$$

The form of expression 16 is useful for several reasons. First, $\Gamma_i$ contains all prior information in one matrix and thus eliminates the need to carry $\Sigma_m$ or $P_{d_i}$ in memory. Second, expression 16 is plainly in a form suited to our reduction theory. To wit, if a.

$$\Gamma \equiv \begin{bmatrix} \Gamma_1 \\ \vdots \\ \Gamma_r \end{bmatrix}, \quad (17)$$

then the sum in expression 16 is $\Gamma^*\Gamma$. Plainly, $\Gamma$ is a block matrix upon which the reduction method herein is immediately applicable, possibly along both row and column dimensions. Third, if $\Gamma$ is suited to column reduction then the resulting R—and its inner product, R*R—has a lower column dimension than $\tilde{\Sigma}_m$ or $\tilde{P}_m$ (expressions 5 and 7). Naturally, because the reduced matrices involved in computing the D-criterion will exist in a lower-dimensional space than the originals, the computation will be faster and have reduced memory overhead.

The purpose in studying dimension reduction for Guided Bayesian design is to increase the computational efficiency. To get a back-of-the-envelope idea of possible savings, suppose each $G_i$ is m-by-n. If each $G_i$ were full column rank, each $R_i$ would be n-by-n and would have at most $n(n+1)/2$ nonzero entries to store (because of upper triangularity). Assuming dense $G_i$, the compression rate in transforming from $G_i$ to $R_i$ would then be $1-(n+1)/(2m)$. For example, if the number of data observations in one composite observation were $(m=)10^6$ and the number of model parameters were $(n=)10^5$, the compression rate would be about 95 percent using RRQR factorization.

If there were significant data/model redundancies, then each $G_i$ might have rank $k<\min(m,n)$, in which case $R_i$ would be k-by-n with at most $k(k+1)/2+k(n-k)$ nonzero entries. Assuming $k=10^4$ and m and n as before, a compression rate of around 99 percent could be attained.

Depending on the dimensions of the underlying system, large compression rates are apparently possible with the RRQR method above. This compression translates into computational savings as described in more detail below.

Algorithms for Optimum Design

Herein, we provide dimension reduction for design problems, so only a brief account is given here of the algorithms for actually optimizing experiments.

Initially, global optimization approaches such as simulated annealing and the genetic algorithm were employed to find the optimum experiments in linearized geoscientific MODA methods like Guided Bayesian survey design, but these approaches are deemed too computationally expensive for all but the smallest problems.

Prevalent these days are sequential algorithms like the Construction, Exchange, and Decimation Algorithms. These algorithms use a greedy approach to optimization in which a solution is optimized through a sequence of local updates which are optimal with respect to the current solution but not necessarily with respect to the global objective function. Greedy optimization does not guarantee global optimality, but Coles and Curtis show that it may come close in the practice of geoscientific MODA. Further details on performance and computational complexity are found in Darrell Coles and Andrew Curtis, "Efficient nonlinear Bayesian survey desing using DN optimization," Geophysics, 76(2): Q1-Q8, 2011 and Darrell Coles and Michael Prange, "Toward efficient computation of the expected relative entropy for nonlinear experimental design," Inverse Problems 28(5): 055019, 2012.

Method

Herein, we provide pseudocodes, based on the theory above, for implementing parallel compression on Jacobian matrices for Guided Bayesian survey design. Three routines are provided: first is the main algorithm (Compress), which is mirrored in the flowchart in FIG. 1; second is a subroutine describing the steps for reducing the row dimensions of a matrix (ReduceRows); third is a subroutine doing the same for the column dimension (ReduceCols).

In the COMPRESS procedure, the job of compression is partitioned into n tasks. The i-th task involves forming or loading the matrix $\Gamma_i$, which corresponds to the i-th composite observation. If the row-dimension of $\Gamma_i$ is much greater than its column-dimension, the ROWREDUCE procedure is invoked, transforming $\Gamma_i$ as described in that procedure. Otherwise, if the column-dimension of $\Gamma_i$ is much greater than its row-dimension, the REDUCECOLS procedure is invoked, transforming $\Gamma_i$ as described in that procedure.

In the REDUCEROWS procedure, the input matrix, $\Gamma$, is decomposed by the rank-revealing QR-factorization into the product of orthonormal matrix Q, upper triangular matrix R, and conjugate-transpose permutation matrix $\Pi^*$, thus $\Gamma = QR\Pi^*$. The rank of R is computed, and R is then truncated by removing all rows whose indices are greater than its rank (this is the actual row-reduction step). $\Gamma$ is then updated by setting it equal to the product of the truncated R matrix and the conjugate-transpose permutation matrix $\Pi^*$.

In the REDUCECOLS procedure, the $\Gamma_i$'s from each distributed task are collected together in one process to form a row-block matrix, $\Gamma^*$. The rank-revealing QR-factorization is applied to decompose $\Gamma^*$ into matrix product $QR\Pi^*$, similar to the REDUCEROWS procedure. The rank of R is computed and the matrix Q is truncated by removing all columns whose indices are greater than the rank of R. The column-truncated Q and permutation matrix $\Pi$ are then broadcast to the processes where the original $\Gamma_i$'s reside, and each $\Gamma_i$ is transformed by left-multiplication with $\Pi^*$ and right-multiplication with the truncated Q matrix.

To provide more detail, please find following additional analysis of FIG. 1. This figure lays out graphically Algorithm 1 (Arrows indicate the flow of operation. In the case of a decision diamond, only one path may be followed—either YES or NO—which depends on whether the condition is true or false.)

Compute/load $G_i$: If the Jacobian matrix for the i-th composite observation has not been generated and stored, it is computed in this step. This computation is problem-dependent and is assumed to be handled by an appropriate external process. If the i-th Jacobian has previously been generated and stored, it is loaded from file.

Transform $G_i$ to $\boxminus\Gamma_i$: Left- and right-multiply $G_i$ by the matrix square root of the i-th data precision matrix and matrix square root of the model covariance matrix, $$\Gamma_i \equiv P_{d_i}^{\frac{1}{2}} G_i \Sigma_m^{\frac{1}{2}},$$

to transform $G_i$ to $\boxminus\boxminus\Gamma_i$. The data precision and model covariance matrices can be loaded and then their square roots computed as part of this step or the square roots can already be computed and loaded directly.

Row>>cols: Decision point. If there are the row-dimension of $\Gamma_i$ is much greater than the column-dimension, goto Row-reduce step; else, goto next decision point.

Row-reduce $\Gamma_i$: follow the REDUCEROWS procedure in Algorithm 1 to reduce the row-dimension of each $\Gamma_i$.

Cols>>max$_i$ rows: Decision point. If there are many more columns in $\Gamma_i$ than there are rows in the largest of $\Gamma_i$'s, goto column-reduce step; else goto Run step.

Column-reduce $\Gamma_i$: follow the REDUCECOLS procedure in Algorithm 1 to reduce the column-dimension of each $\Gamma_i$.

Run GBSD: With the compressed $\Gamma_i$'s from the foregoing routine, run Guided Bayesian Survey Design. The GBSD routine only requires the $\Gamma_i$ matrices and is independent of whether they have been compressed or not.

Note that because evaluating candidate (composite) observations in D-optimization involves computation with the rows of the Jacobian matrix corresponding to each candidate (8), it is generally more efficient to pre-compute the entire Jacobian than to load/compute entries as needed. So doing prevents re-computing entries and/or redundant I/O, which would otherwise occur since candidates are usually visited/evaluated more than once in the course of an optimization routine. The pseudocodes and workflow below assume the entire Jacobian has been pre-computed.

---

Algorithm 1 Compression of the $\Gamma_i$ is performed in parallel for row compression, and partially in parallel for column compression. The $P_{d_i}^{\frac{1}{2}}$ and $G_i$ matrices are computed locally by each process. The $\Sigma_m^{\frac{1}{2}}$ matrix is computed once and then may be efficiently distributed to processors using a broadcast approach.

1: procedure COMPRESS
2:   for i = 1 . . . n do   ▷ Each i can be run in separate processors
3:     $\Gamma_i \leftarrow P_{d_i}^{\frac{1}{2}} G_i \Sigma_m^{\frac{1}{2}}$
4:     if ROWS($\Gamma_i$) >> COLS($\Gamma_i$) then
5:       $\Gamma_i \leftarrow$ REDUCEROWS($\Gamma_i$)
6:     end if
7:   end for -continued Algorithm 1 Compression of the $\Gamma_i$ is performed in parallel for row compression, and partially in parallel for column compression. The $P_{d_i}^{\frac{1}{2}}$ and $G_i$ matrices are computed locally by each process. The $\Sigma_m^{\frac{1}{2}}$ matrix is computed once and then may be efficiently distributed to processors using a broadcast approach.

8:   if COLS($\Gamma$) >> max$_i$ ROWS($\Gamma_i$) then▷ All $\Gamma_i$ have equal column size
9:     REDUCECOLS
10:   end if
11: end procedure
12: procedure REDUCEROWS($\Gamma$)
13:   {Q, R, Π} ← RRQR($\Gamma$)
14:   k ← RANK(R)
15:   $\Gamma$ ← R(1 : k, :)Π
16:   return $\Gamma$
17: end procedure
18: procedure REDUCECOLS
19:   $\Gamma^* \leftarrow [\Gamma_1^*, \Gamma_2^*, \ldots, \Gamma_n^*]$   ▷ Get $\Gamma_i$ from each processor
20:   {Q, R, Π} ← RRQR($\Gamma^*$)   ▷ Perform RRQR in the main processor
21:   k ← RANK(R)
22:   for i = 1 . . . n do
23:     $\Gamma_i \leftarrow \Pi^* \Gamma_i Q(:, 1 : k)$   ▷ Send Q and Π to each processor for local evaluation
24:   end for
25: end procedure Distributed computing is implied in these pseudocodes through the process variable, which is everywhere indexed with 'i'. Anywhere the 'i' subscript is seen, it refers to work or variables associated with the i-th of n processes.

'Global' variables are global only within a process, not across processes. All routines on a process with declared global variables have access to, and can change, those declared variables. If a variable is not declared globally, it is local to its routine and process. FIG. 1 illustrates this. Refer to the pseudocodes in the text for more details.

4.1 EXAMPLE 1

Reduction Demonstration

To illustrate the RRQR reduction routine, we start with a simple example. Consider the matrix $A \in \mathbb{R}^{100 \times 5}$, where $A_{ij} \equiv e^{\cos[5(i-1)+j]}$. Suppose A is partitioned as $$A \equiv \begin{bmatrix} A_1 \\ A_2 \end{bmatrix},$$

with equal-size partitions. If the RRQR-factorizations of $A_1$ and $A_2$ are $A_1 \Pi_1 = Q_1 R_1$ and $A_2 \Pi_2 = Q_2 R_2$, respectively, then the nontrivial parts of $R_1$ and $R_2$ are $$R_1 = \begin{bmatrix} -10.72 & -4.68 & -5.61 & -8.94 & -6.07 \\ 0.00 & 9.49 & 7.27 & 2.41 & 7.00 \\ 0.00 & 0.00 & 5.39 & -3.27 & -3.73 \\ 0.00 & 0.00 & 0.00 & 3.95 & 2.93 \\ 0.00 & 0.00 & 0.00 & 0.00 & 1.86 \end{bmatrix} \text{ and}$$

-continued $$R_2 = \begin{bmatrix} -10.88 & -4.62 & -5.42 & -9.23 & -6.14 \\ 0.00 & -9.51 & -7.33 & -2.38 & -7.00 \\ 0.00 & 0.00 & 5.36 & -3.22 & -3.70 \\ 0.00 & 0.00 & 0.00 & -3.93 & -2.93 \\ 0.00 & 0.00 & 0.00 & 0.00 & -1.87 \end{bmatrix},$$

with corresponding permutation matrices $$\Pi_1 = \begin{bmatrix} 1 & 0 & 0 & 0 & 0 \\ 0 & 0 & 0 & 1 & 0 \\ 0 & 0 & 0 & 0 & 1 \\ 0 & 1 & 0 & 0 & 0 \\ 0 & 0 & 1 & 0 & 0 \end{bmatrix} \text{ and}$$

$$\Pi_2 = \begin{bmatrix} 1 & 0 & 0 & 0 & 0 \\ 0 & 0 & 0 & 1 & 0 \\ 0 & 0 & 0 & 0 & 1 \\ 0 & 1 & 0 & 0 & 0 \\ 0 & 0 & 1 & 0 & 0 \end{bmatrix}.$$

Denoting the RRQR factorization of the row-block matrix formed by $R_1 \Pi^*_1$ and $R_2 \Pi^*_2$ $$\begin{bmatrix} R_1 \Pi^*_1 \\ R_2 \Pi^*_2 \end{bmatrix} \Pi = QR,$$

then the nontrivial part of R is $$R = \begin{bmatrix} 15.27 & 6.58 & 7.80 & 12.85 & 8.63 \\ 0.00 & -13.43 & -10.33 & -3.38 & -9.90 \\ 0.00 & 0.00 & -7.60 & 4.59 & 5.25 \\ 0.00 & 0.00 & 0.00 & -5.58 & -4.14 \\ 0.00 & 0.00 & 0.00 & 0.00 & -2.64 \end{bmatrix},$$

with permutation $$\Pi = \begin{bmatrix} 1 & 0 & 0 & 0 & 0 \\ 0 & 0 & 0 & 1 & 0 \\ 0 & 0 & 0 & 0 & 1 \\ 0 & 1 & 0 & 0 & 0 \\ 0 & 0 & 1 & 0 & 0 \end{bmatrix}$$

Figure 2:
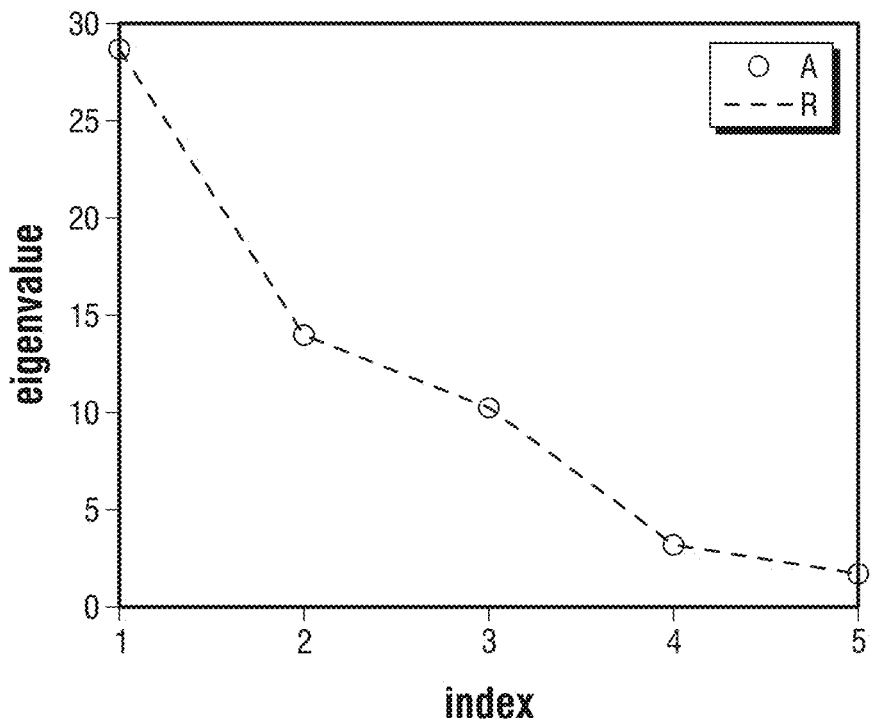
FIG. 2 is a plot of nonzero eigenspectra as a function of index.

While it is easily shown that $R^*R \neq A^*A$, FIG. 2 demonstrates that the nonzero eigenspectra of R and A are indeed identical, as predicted by theory.

4.2 EXAMPLE 2

Marine Seismic Survey Optimization

Figure 3:
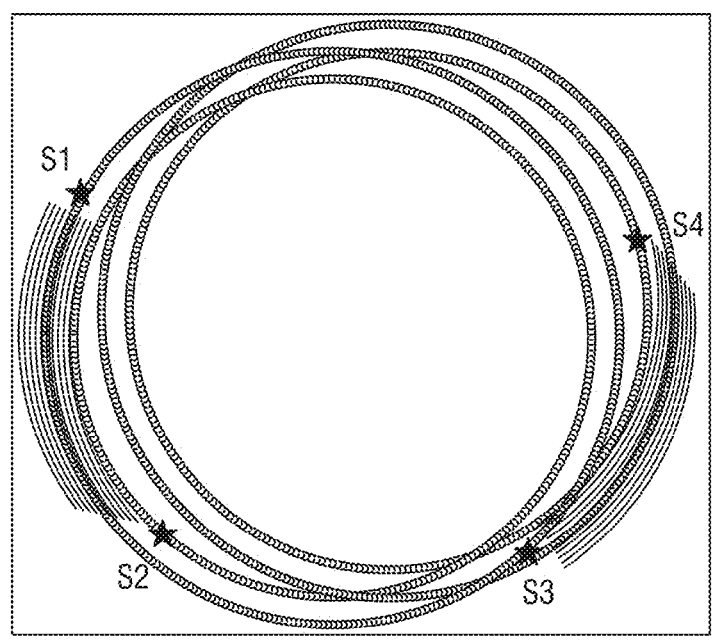
FIG. 3 is a schematic of Dual Coil Shooting geometry.
Figure 4A:
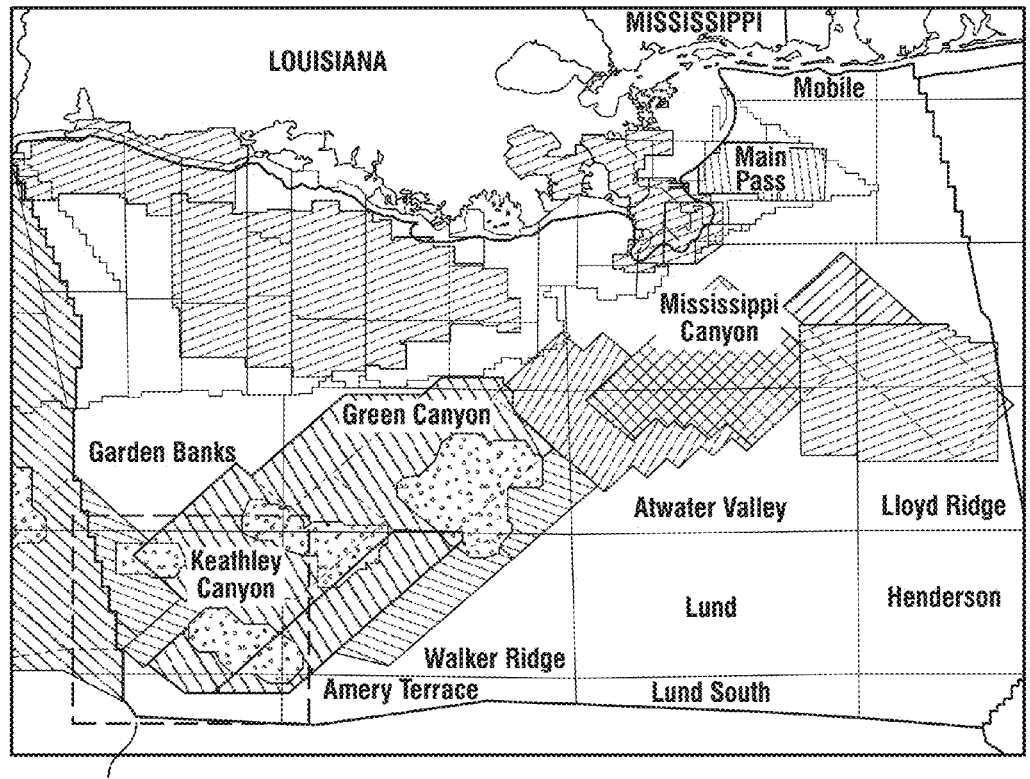
FIGS. 4A-4B are a series of schematics of a region of land.
Figure 4B:
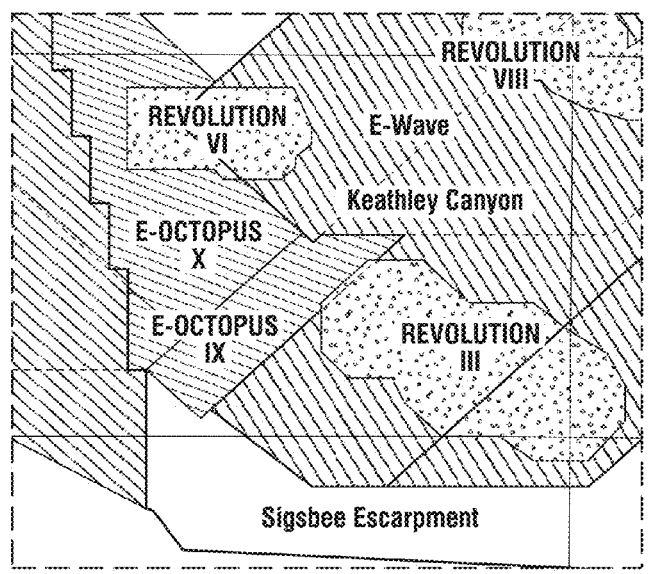

This example demonstrates the compression methodology as part of a Guided Bayesian design workflow to optimize a Dual Coil Shooting multi-vessel full-azimuth survey (FIG. 3) on a real field in the Gulf of Mexico. FIG. 3 illustrates two recording spreads (blue) and four sources (stars) follow a coil path (red). Typical coil diameter is 12.5 km. (reproduced from WesternGeco). FIG. 4 illustrates the area of investigation is the Revolution-III zone over Keathley Canyon, Walker Ridge, and Sigsbee Escarpment. The Revolution-III site contains a salt body, beneath which is an anticlinal feature that may bear hydrocarbons.

Figure 5:
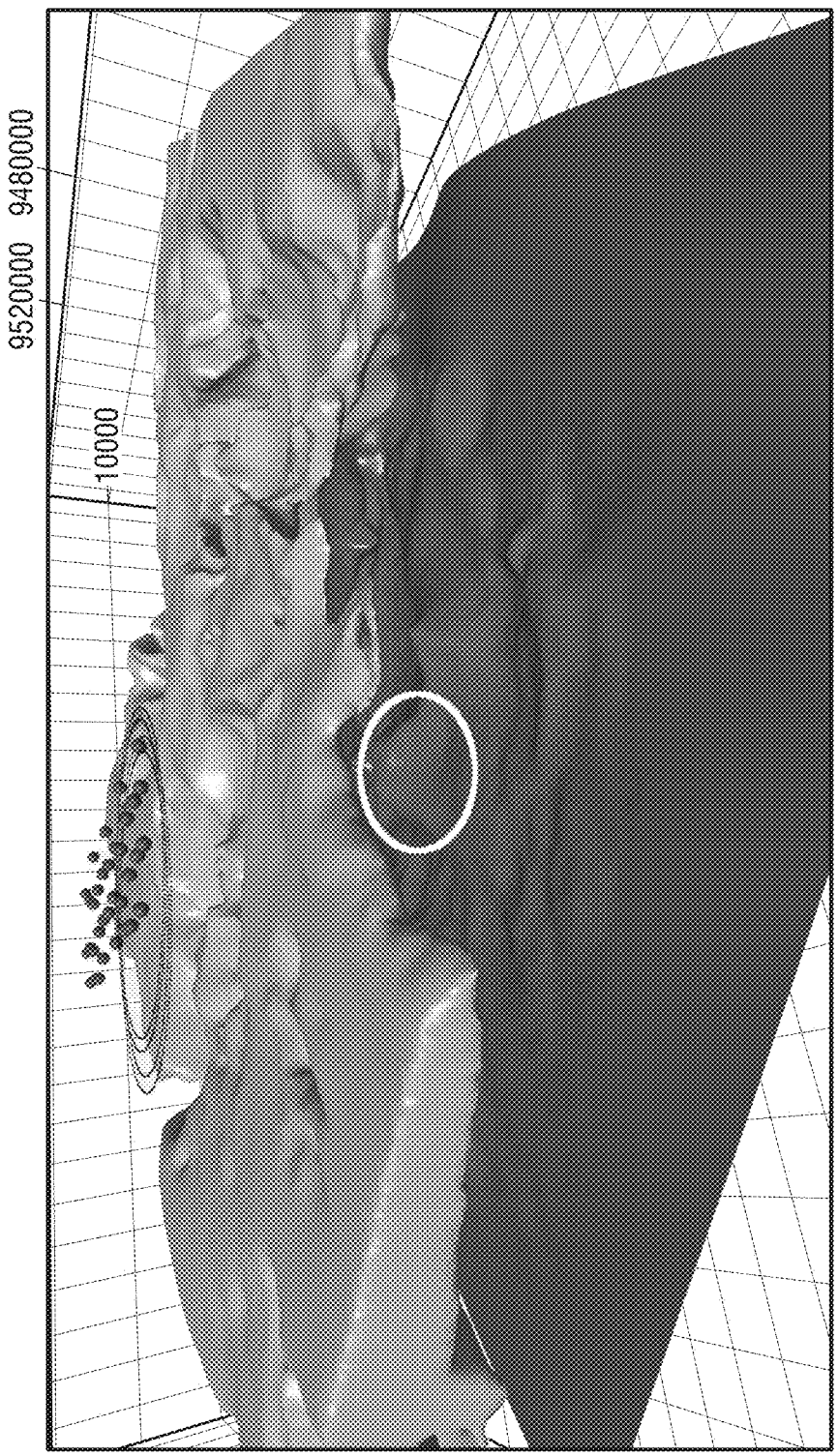
FIG. 5 is an illustration of coil positions.

The design exercise was to identify coil positions to optimally illuminate a steep flank of the anticline, which was under-illuminated by previous seismic data acquisition. Thirty-four coil positions were selected as candidates, as shown in FIG. 5 (Salt body (gray) and target horizon (magenta) at Revolution-III. Top of salt is 3.1 km BSL. Target horizon is ~9.8 km BSL. Yellow encircled region indicates the target anticline. Red dots are the centers of the 34 candidate coils. Orange dots indicate the source footprint for one coil (12.5 km in diameter)).

Figure 6:
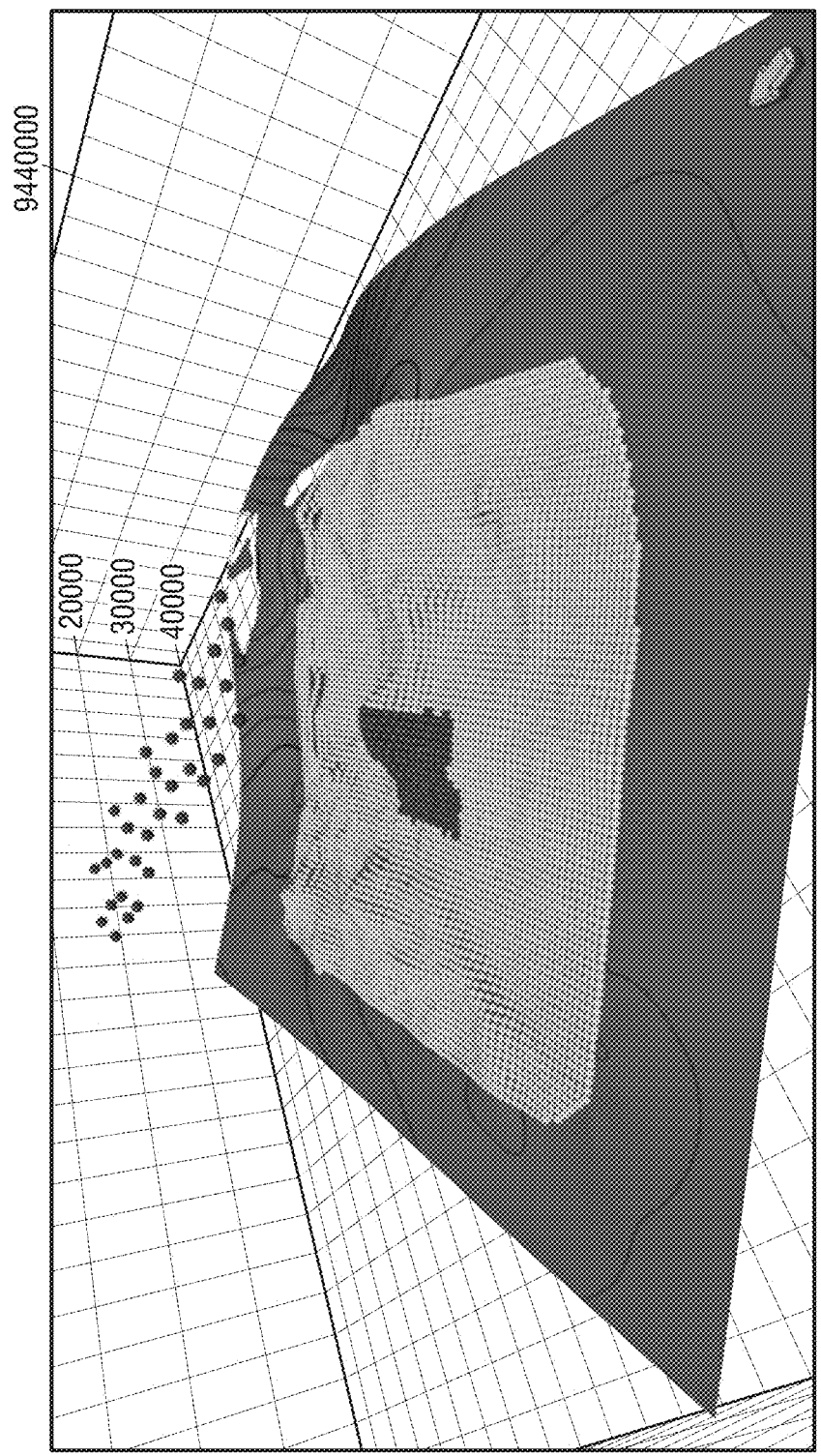
FIG. 6 illustrates point scatterer positions on on target horizon

Each coil comprised 1112 source shots, recorded by 3200 receivers towed behind two vessels, for a total of 3558400 shot-receiver pairs per coil. An encompassing surface patch at the lithological interface of the anticline was selected as the target horizon. This horizon was discretized into 7747 facets as shown in FIG. 6. FIG. 6 provides point scatterer positions on on target horizon (yellow and orange dots). Orange delineates high uncertainty. Red dots are candidate coil centers. Each facet was treated as a point scatterer with model parameters representing the elastic contrast across the interface. Thus, the Jacobian for a single coil (composite observation) was 3558400-by-7747, which would require as much as 205 gigabytes (GB) of RAM at double precision, meaning the set of all candidates Jacobians would require as much as 6.8 terabytes (TB).

Using ray tracing on an earth model built from an earlier seismic dataset, P-wave rays reflected off the target horizon were simulated for each source-receiver pair. An analytic expression was used to compute entries in the Jacobian for each ray, which depended on its complex amplitude coefficient, travel time, point of incidence position on the target horizon, and the central shot frequency. The ray tracing was performed in advance, and the amplitudes, travel times, and positions were stored to disk.

The model prior distribution was multinormal with mean (reference model) equal to the earth model inferred from an earlier seismic data set (and used in the ray tracing here). The prior model covariance was made diagonal, meaning the model parameters at the point scatterers in FIG. 6 were uncorrelated. The variances along the diagonal were set to be 100 times greater in the flank region (FIG. 6, red dots) than the background (FIG. 6, blue dots), making the standard error or uncertainty along the flank 10 times greater than the background. The data noise was also modeled as multinormal with zero mean, zero correlation, and standard deviation set to 10 percent of the mean seismic trace amplitude.

Guided Bayesian survey design was used to optimize the order in which coils are added to the survey, from most informative to least informative. The optimization was performed without compression to provide a baseline for assessing the performance with compression. The optimization without compression was performed in parallel on 34 2.60 GHz CPUs distributed over 8 machines with 64 GB RAM each. The optimization with compression was multi-threaded and performed on a laptop with 8 2.50 GHz CPUs and 16 GB RAM.

Several snapshots of the optimum selection order prescribed by GBSD are shown in FIGS. 7A to 7I. Model uncertainty is reported relative to the background and expresses a ratio of standard deviations. The target area, including the anticlinal flank (red patch, top left), was given an uncertainty 100 times greater than the background. Candidate coils: red dots; Selected coils: green dots. Numbers in the top-right of each panel indicate the number of optimally selected coils.

Notice that the first five optimally selected coils are responsible for the majority of the reduction in forecasted model uncertainty in the target area. This is precisely the result expected from GBSD. The most informative coils are those that reduce the highest uncertainties, and these are selected first in the optimization. Notice also that the positions of the first 5 coils are not necessarily those one might intuitively select. A more natural choice would seemingly be simply to cluster the coils more or less directly over the target area. However, the high-contrast, rugose salt body between the shot-receiver plane and the target horizon complicates raypath geometries to a point that intuitive coil placement is impossible and a more rigorous approach, like Guided Bayesian design, is required. The ability to prioritize observations (data) according to their relative information content, and the non-intuitive geometry of the surveys thus optimized, are the hallmarks and main advantages of model-oriented design and analysis.

We confirmed the compression routine by verifying that the optimal selection order agreed between the compression and non-compression runs of the GBSD workflow. The value of the D-criterion objective function was also verified to agree for each added coil in the optimal selection sequence.

The main confirmation of our methodology is in the performance comparison in Table 1.

TABLE 1

Performance with and without compression.

| | Compression* | No Compression** |
|---|---|---|
| Compression Rate | 99.83% | 0% |
| Max RAM Required | 3 GB | 255 GB |
| Compute G Runtime | 28 min | 2 min |
| Compression Runtime | 1 min | 0 min |
| Optimization Runtime | 28 min | 1800 min |
| Total Runtime | 40 min | 1802 min |

*Performed on an 2.50 GHz/16 GB RAM laptop.
**Performed on 34 2.60 GHz CPUs over 8 machines with 64 GB RAM each.

We achieved a 99.83 percent rate of compression with our method. If the G matrices corresponding to the candidate coils had been dense, they would have required 6.8 TB of storage before compression and only 11.8 GB afterwards. In point of fact, the G matrices were sparse, so even less RAM was required than predicted. Over the course of the entire workflow—compression and optimization—the maximum RAM used was approximately only 3 GB. Without compression, the maximum RAM used was approximately 255 GB. Concomitant with the gain in memory efficiency was an improvement in total runtime, which decreased from more than a day to less than an hour. Another important point is that the compressed problem was small enough that we were able to migrate the execution from a computing cluster to a laptop. The total runtime reported for the compression-aided workflow is indeed for a laptop, while that for the unaided workflow is for a cluster.

5 DISCUSSION

The theory and presented results illustrate that deterministic compression methods can be effectively implemented in parallel to reduce the memory and computational requirements of model-oriented design techniques such as Guided Bayesian survey design.

When employed as a pre-processing step, compression creates efficiencies in the subsequent analysis chain that are potentially quite large, especially when working with large data volumes that contain significant redundancies and/or when a substantial disparities exist between the size of data and model spaces.

Distributed compression methods are potentially applicable to a variety of other data analysis problems, as well as GBSD. The nonlinear MODA technique called $D_N$-optimization operates on large data covariance matrices for which distributed compression may be applicable. Any inverse problem involving large Jacobians and/or covariance matrices, such as full waveform inversion, is also a potential candidate. The field of seismic history matching already examines dimension reduction methods and may benefit from distributed approaches such as the one developed here. Problems in feature extraction common to the pattern recognition and artificial intelligence communities could also benefit from our method.

An aspect of compression not explicitly addressed here is sparsity. It was noted in the marine seismic survey optimization example that the Jacobian matrices were sparse. There are many standard methods to store and operate on sparse matrices, and many common algorithms in linear algebra have been modified and optimized for sparse matrices, such as the sparse SVD and sparse QR factorization. Our seismic example took advantage of sparsity in terms of storage (sparse matrix formats were used for the compressed and uncompressed runs) and in terms of the matrix factorization (the rank-revealing QR factorization is optimized for sparse matrices). With big data, it is a good idea to take advantage of sparsity whenever possible because it minimizes the memory footprint and eliminates useless computation.

It was noted that the column reduction algorithm, Reduce-Cols, herein could not be distributed. This is because column reduction corresponds to a compression of model space, and compression is a kind of transformation. We cannot transform the model parameters one way for one observation and a different way for another, because then the information provided by the two observations is no longer compatible since the observations 'refer' to two different model spaces. Consequently, whatever compressive transformation is performed on model space, it must be the same transformation for every data observation. If the transformation is effected by matrix factorization (as is done here), that factorization must be with respect to all possible data observations; hence, the column reduction algorithm must operate on all candidate Jacobians at once and cannot be distributed. Fortunately, column (model) reduction may be omitted from the workflow without invalidating the theory. If it is apparently too expensive to execute column reduction, it can simply be ignored.

We have introduced a method of dimension reduction using rank revealing QR-factorization to compress Jacobian matrices associated with Guided Bayesian survey design. The method is specifically designed to address 'Big Data' problems, which are prevalent in industrial geoscience and require advanced techniques like Guided Bayesian survey design to intelligently manage data volumes as they stream to processing workflows. The methodology can be used to reduce the row and/or column dimensions.

Column reduction is more complicated than row reduction when working with Jacobian matrices, however, because the column dimension associates with model space.

Model space reduction must be consistent for all data observations, and this precludes a parallel implementation of column compression. Consequently, column reduction can be expensive computationally. However, the theory permits column reduction to be omitted in the compression workflow.

It was also pointed out that matrix sparsity is beneficial in big data problems. Efficient storage formats and optimized matrix factorizations can be used to reduce the memory footprint and minimize needless computation when data structures are sparse. We used sparse storage in our marine seismic example which, coupled with compression, reduced the memory footprint from a possible 6.8 TB to only 3 GB. We also used a matrix factorization that was optimized for sparse matrices.

A key advantage of our compression technique is that it is parallelizable. The work of dimension reduction can be partitioned over multiple processes to minimize the impact of big data on both memory and computational requirements. Without this, many big data problems might otherwise be too large to handle.

We also note that distributed compression technologies may be applied in many other data analysis settings, from large-scale inversion problems to nonlinear design problems to feature extraction.

The compression method was illustrated on a real marine seismic survey optimization problem in which the 'units of observation' were groupings of several million shot-receiver pairs arrayed in coil geometries 12.5 km in diameter. In the worst case, the Jacobian matrices associated with these coils would have required several terabytes of storage, but a compression rate of 99.83 percent was achieved. Thanks to this high rate, the memory footprint of the Guided Bayesian workflow was reduced to a point that the optimization could be—and was—performed on a laptop, rather than on a computing cluster. By reducing the dimensions of the problem, the computational runtime of the Guided Bayesian survey optimization was also reduced by more than an order of magnitude—from days on a cluster to hours on a laptop.

In conclusion, we have shown that dimension reduction methods can open the door for the optimization of truly industrial-scale experiments in geoscience. With this advance, it becomes possible to optimally minimize forecasted model uncertainties through a robust method of (a priori or a posteriori) data selection on the kinds of problems the petroleum and other industries routinely face today.

The invention claimed is:

1. A method of categorizing a subterranean formation, comprising:
   collecting data related to the formation;
   performing an algorithm comprising guided Bayesian survey design wherein the performing comprises compressing a plurality of matrixes of an objective function associated with the guided Bayesian survey design;
   based at least in part on maximizing the objective function, identifying data observations to collect; and
   collecting additional data observations related to the formation.

2. The method of claim 1, wherein the performing comprises forming the plurality of matrixes or loading the plurality of matrixes or both.

3. The method of claim 1, wherein the performing comprises dimension reduction.

4. The method of claim 1, wherein the performing comprises a COMPRESS procedure.

5. The method of claim 4, wherein the COMPRESS procedure comprises dimension reduction.

6. The method of claim 1, wherein the performing comprises distributable matrix factorization.

7. The method of claim 6, wherein the factorization comprises rank-revealing factorization.

8. The method of claim 6, wherein the factorization comprises rank-revealing QR factorization.

9. The method of claim 1, wherein the performing comprises a REDUCEROWS procedure.

10. The method of claim 9, wherein the REDUCEROWS procedure comprises calculating a rank.

11. The method of claim 10, wherein the REDUCEROWS procedure comprises eliminating matrix rows whose indices are greater than the rank.

12. The method of claim 1, wherein the performing comprises a REDUCECOLS procedure.

13. The method of claim 12, wherein the REDUCECOLS procedure comprises calculating a rank.

14. The method of claim 13, wherein the REDUCECOLS procedure comprises eliminating matrix columns whose indices are greater than the rank.

15. The method of claim 1 wherein the compressing comprises parallel processing.

16. A method comprising:
   receiving information associated with model parameters;
   for an equation that comprises a vector of data vectors, a vector of Jacobian matrixes, and a model parameter vector wherein the Jacobian matrixes comprise derivatives of functions with respect to the model parameters of the model parameter vector, compressing the Jacobian matrixes to generate compressed matrixes; and
   based at least in part on the compressed matrixes, maximizing an objective function to determine one or more data acquisition parameters.

17. The method of claim 16 wherein the compressing the Jacobian matrixes comprises transforming the Jacobian matrixes to a block matrix.

18. The method of claim 17 wherein the block matrix comprises composite observation matrixes.

19. The method of claim 16 wherein the compressing comprises parallel processing.

20. The method of claim 16 wherein the data observations correspond to rows and wherein the model parameters correspond to columns of the Jacobian matrixes.

21. A computer comprising:
   at least one processor;
   memory accessibly by the at least one processor; and
   code executable by the at least one processor to implement an algorithm that compresses a plurality of matrixes of an objective function associated with a guided Bayesian survey design to reduce memory demand and that maximizes the objective function to determine one or more data acquisition parameters of a seismic survey.

* * * * *